July 16, 1935.  A. J. WEATHERHEAD, JR  2,008,429
MERCHANDISING DEVICE
Filed July 27, 1933  2 Sheets—Sheet 1
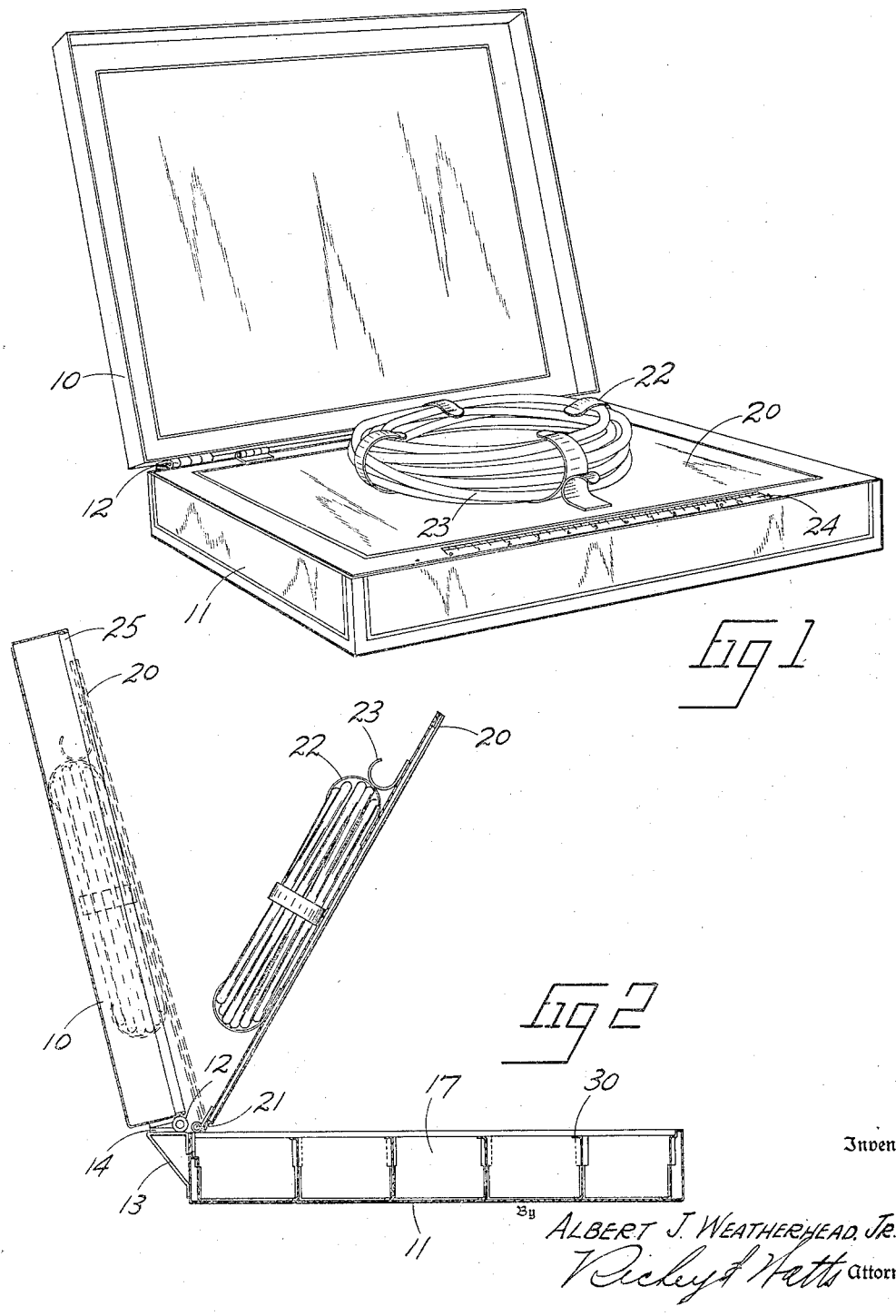
Inventor
ALBERT J. WEATHERHEAD, JR.
By Rickey & Watts Attorney July 16, 1935.   A. J. WEATHERHEAD, JR   2,008,429
MERCHANDISING DEVICE
Filed July 27, 1933   2 Sheets-Sheet 2
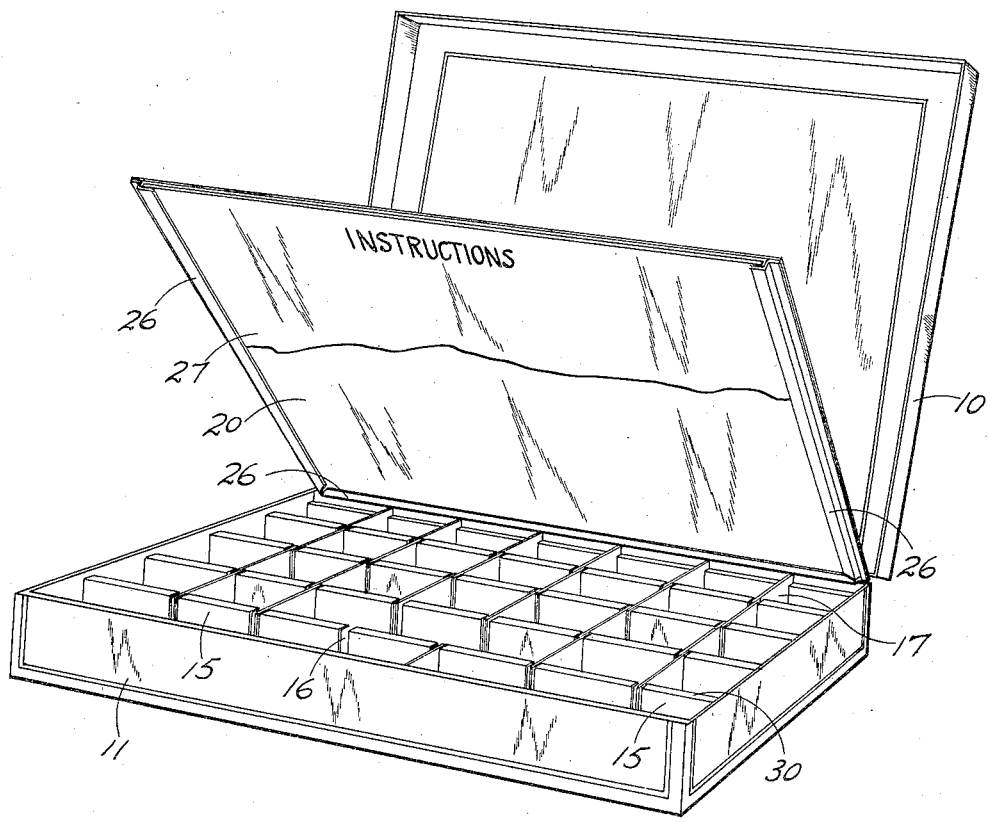
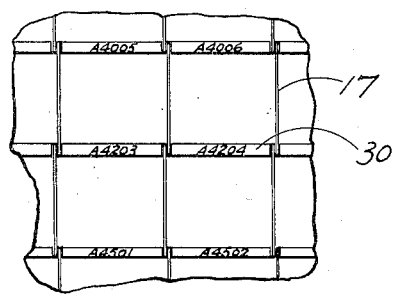
Inventor
ALBERT J. WEATHERHEAD, JR.
By
Attorney Patented July 16, 1935

2,008,429

UNITED STATES PATENT OFFICE 2,008,429

MERCHANDISING DEVICE

Albert J. Weatherhead, Jr., Cleveland, Ohio, assignor to The Weatherhead Company, Cleveland, Ohio, a corporation of Ohio Application July 27, 1933, Serial No. 682,384

2 Claims. (Cl. 206—1)

This invention relates to merchandising devices and more particularly to a device for storing and dispensing nonmetallic hose and fittings therefor of the type used in connection with oil and gasoline lines of motor cars.

Because of the almost universal practice of providing flexible or resilient supports for the engines of modern automobiles, it is necessary to employ flexible tubing for the gasoline and oil connections in order to permit relative movement to take place between the engine and the frame of the car without destroying the tubing. Flexible tubing of this character is subjected to severe conditions in service and while the tubing is generally durable, occasional replacements are required. Various makes of motor cars and various other internal combustion engine applications require different lengths of tubing and different types and combinations of fittings and connections at the ends of the tubing. Because of the large number of different makes and models of cars in use, as well as new designs and applications being continually evolved, it is impractical for a garage or service station operator to carry a complete stock of assembled hoses to service all uses, and the most satisfactory method is for the mechanic to make up hoses for each particular job.

Accordingly, it is a general object of my invention to provide a merchandising device adapted to contain a supply of tubing and a supply of fittings, whereby replacement hoses for the flexible gasoline and oil lines of various makes of motor cars and other automotive devices can be readily assembled. Another object of my invention is to provide a compact container for the hose and fittings, having a number of compartments adapted to contain fittings of the different types. Another object of my invention is to provide a dispensing device adapted to carry an instruction sheet giving data concerning the length of hose and the types of fittings required for various makes of cars, the various compartments for containing fittings being provided with numbers or other suitable indicia correlated with the instruction sheet so that the proper fittings can readily be found. A further object is to provide a dispensing system in which the instruction sheet, the various compartments for containing the fittings and the fittings themselves all carry correlated numbers or other indicia so that an unskilled mechanic can rapidly and easily make the required assembly of hose and fittings for any particular make of car. Another object is to provide a dispensing device embodying means for preventing the fittings from being displaced from their proper compartments. A further object is to provide a dispensing device which will make an attractive display.

Further objects and advantages of my invention will become apparent from the following description of a preferred form thereof, reference being made to the accompanying drawings.

Briefly, my dispensing device comprises a box formed with upper and lower portions hinged together at their rear ends. The upper portion is adapted to contain a coil of hose, while the lower portion is divided into a plurality of compartments for containing the necessary fittings, the two portions being separated by a hinged flap which supports the coil of hose within the upper portion and also forms a closure for the individual compartments in the lower portion. The flap is also adapted to carry a removable card bearing instructions for making up hoses for different makes of motor cars. Brackets are mounted on the rear of the lower portion to support the upper portion in substantially vertical position, and the flap which carries the coil of hose may be swung upwardly to rest against the upper portion of the box.

In the drawings, Fig. 1 is a perspective view of my merchandising device showing the upper portion raised but with the flap in position to close the compartments of the lower portion; Fig. 2 is a transverse section through my merchandising device, illustrating the upper portion in raised position; Fig. 3 is a perspective view showing the upper portion in raised position and the flap in an intermediate position to expose the compartments in the lower portion of the box; Fig. 4 is a fragmentary plan view of an enlarged scale showing the identifying numerals applied to the compartments in the lower portion; and Fig. 5 illustrates one type of fitting bearing an identifying numeral.

Referring in detail to the drawings, my merchandising device preferably comprises a sheet metal box having an upper portion 10 and a lower portion 11 suitably hinged together by hinges 12 of any ordinary type. Both the upper and lower portions are of substantial depth to have an ample capacity for hose and fittings, and as shown in Fig. 2, brackets 13 are provided adjacent the hinges 12 for supporting the upper portion when the box is open. These brackets may be secured to the lower portion by spot welding or any other convenient method and, if desired, the lower half of the hinges 12 may be spot welded directly to the brackets, as indicated at 14.

The lower portion of the box is divided into a plurality of compartments by fixed longitudinal partitions 15 which are cut away as at 16 to receive removable transverse partitions 17. These compartments are adapted to receive the various fittings and by changing the arrangement of the removable partitions 17, compartments of various sizes can be obtained to accommodate various sizes and quantities of fittings.

In order to form a closure for the various compartments and to prevent the fittings contained therein being displaced accidentally, I provide a flap 20 hinged to the lower portion of the box as at 21. On its upper side, the flap 20 carries a plurality of brackets 22 for supporting a coil of hose within the upper portion of the box and, if desired, a curved member 23 may be provided so that the flap can be readily lifted to expose the compartments in the lower portion of the box. The flap may also carry a scale 24 so that the hose may be conveniently cut to correct length. In its lower position, as illustrated in Fig. 1, the flap rests on the tops of the partitions forming compartments in the lower portion of the box, the top of the flap being substantially flush with the top edges of the walls of the lower portion. In its raised position, as illustrated in dotted lines in Fig. 2, the flap is supported by engagement of the brackets 22 with the inside of the top portion of the box. It is to be noted that the hinges 12 and 21 are offset from each other so that when the flap is swung upwardly there is some clearance, as indicated at 25, so that the edge of the flap may be readily grasped.

The lower side of the flap is provided with guideways 26 which are adapted to receive and support an instruction card 27 giving data concerning the length of hose and the type of fitting required for any particular installation as well as general instructions for assembling the hose and fittings. The data concerning the length of hose and type of fitting may be arranged, for example, as follows:

| Make of car | Year | Gasoline line | |
|---|---|---|---|
| | | Part numbers | Hose length |
| Car A | 1933 | A4502 A4104 | 6¼" |
| Car B | 1931 | A4412 A4204 | 6¼" |
| Car B | 1932 | A4502 A4104 | 6¼" |
| Car B | 1933 | A4502 A4104 | 6¼" |
| Car C | 1932 | A4007 A4614 | 5" |
| Car C | 1933 | A4007 A4614 | 5" |

It will be seen that by this arrangement, the length of hose required and the type of fitting, identified by a numeral, is given for each of the various makes of cars. In order to avoid any possibility of mistake on the part of the mechanic making up the replacement hose, the longitudinal partitions 15 in the lower portion of the box are flanged over at their upper edges as indicated at 30, and as shown in Fig. 4 the identifying numbers of the parts contained in the various compartments are marked on the flanges 30 adjacent each compartment. Furthermore, as shown in Fig. 5, the numbers of the parts are also stamped on the fittings themselves so that the fittings can be replaced in their proper compartments and so that there will be no possibility of error in assembling the hoses.

The box may be used year after year, for the instruction sheet is removable so that new instructions can be issued for new models of cars, and as the transverse partitions are removable the compartments can be rearranged to accommodate any types of fittings and can be readily renumbered to properly identify the fittings. The fittings themselves form no part of the present application although various types of fittings are disclosed and claimed in pending patent applications filed by myself. The particular type of fitting illustrated in Fig. 5 of the drawings is disclosed and claimed in my copending application Serial No. 649,833, filed January 3, 1933, and preferably many of the fittings embody the construction of this application whereby the fittings can be securely and permanently joined to the hose without the use of special tools.

In use, the mechanic needs only to look up the particular make, model and year of the car, determine the necessary hose length, and cut off a section of hose using the scale on the upper side of the flap, select the proper fittings, which can readily be found by the identifying numerals carried on the partitions, and assemble and install the hose in the car. The box forms an attractive display, particularly when the upper portion is open, as illustrated in Fig. 1, and if desired advertising matter can be carried on the inside of the upper portion of the box. The flap not only functions to support the hose and the instruction sheet, but also forms a convenient work bench for cutting off the hose to the correct length and provides a closure for the compartments in the lower portion so that the box can be carried around and moved from place to place without danger of the fittings being displaced. When the flap is open, all of the fittings are exposed so that the service station operator can determine at a glance whether his supply of fittings is complete. In practice, the box is sold with an adequate supply of hose and various numbers of fittings of different types, there being more of the fittings for which there is a frequent demand.

In the foregoing specification, I have described only a preferred form of my merchandising device. Various modifications and changes within the scope of my invention will be apparent to those skilled in the art. Accordingly, I do not wish to be limited to the precise disclosure herein or in any manner other than by the appended claims.

I claim:

1. A merchandising device comprising a box having upper and lower storage compartments, a plurality of brackets shaped to provide supporting sections parallel to the bottom wall of the lower compartment secured to a side wall of said lower compartment, a hinge leaf secured to each of said bracket supporting sections, the pintle bearing of the hinge leaf disposed adjacent said side wall, a complementary hinge leaf secured to a side wall of said upper storage compartment, said upper compartment hinge leaf arranged to abut the lower compartment hinge leaf at a point remote from the compartment wall when the upper compartment is swung on the hinge pintle, said hinge pintle disposed above the plane of the lower leaf to effect a tilting of the upper compartment.

2. A merchandising device comprising a box having upper and lower storage compartments, a plurality of brackets shaped to provide supporting sections parallel to the bottom wall of the lower compartment secured to a side wall of said lower compartment, a hinge leaf secured to each of said bracket supporting sections, the pintle bearing of the hinge leaf disposed adjacent said side wall, a complementary hinge leaf secured to a side wall of said upper storage compartment, said upper compartment hinge leaf arranged to abut the lower compartment hinge leaf at a point remote from the compartment wall when the upper compartment is swung on the hinge pintle, said hinge pintle disposed above the plane of the lower leaf to effect a tilting of the upper compartment, a panel disposed between said upper and lower compartments having a hinged connection with said lower compartment along the side carrying the hinge supporting brackets for the upper compartment, the hinge axis of said panel spaced from said upper compartment hinge axis in the plane of said bracket to effect an inclination of said panel with respect to the upper compartment and to space the upper edge of said panel from the upper edge of the compartment when said panel is swung away from the lower compartment.

ALBERT J. WEATHERHEAD, Jr.